(12) United States Patent
Klein et al.

(10) Patent No.: US 12,537,563 B2
(45) Date of Patent: Jan. 27, 2026

(54) COUPLING DEVICE FOR WIRELESS DATA AND ENERGY TRANSFER, AND COUPLING SYSTEM FOR WIRELESS DATA AND ENERGY TRANSFER

(71) Applicant: Phoenix Contact GmbH & Co. KG, Blomberg (DE)

(72) Inventors: Daniel Klein, Blomberg (DE); Frank Hakemeyer, Horn-Bad Meinberg (DE); Maik Stemme, Auetal (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 480 days.

(21) Appl. No.: 17/917,821

(22) PCT Filed: Apr. 1, 2021

(86) PCT No.: PCT/EP2021/058705
§ 371 (c)(1),
(2) Date: Oct. 7, 2022

(87) PCT Pub. No.: WO2021/204694
PCT Pub. Date: Oct. 14, 2021

(65) Prior Publication Data
US 2023/0134291 A1 May 4, 2023

(30) Foreign Application Priority Data
Apr. 9, 2020 (BE) .................................. 2020/5236

(51) Int. Cl.
*H04B 5/79* (2024.01)
*H02J 50/00* (2016.01)
(Continued)

(52) U.S. Cl.
CPC .............. *H04B 5/79* (2024.01); *H02J 50/005* (2020.01); *H02J 50/10* (2016.02); *H02J 50/12* (2016.02);
(Continued)

(58) Field of Classification Search
CPC ... H04B 5/26; H04B 5/72; H04B 5/79; H04B 5/266; H04B 5/22; H04B 5/24;
(Continued)

(56) References Cited

U.S. PATENT DOCUMENTS 8,253,278 B2 * 8/2012 Cook ..................... H01Q 7/08
307/104
10,984,947 B2 * 4/2021 Grunberg ................. H04B 5/79
(Continued)

FOREIGN PATENT DOCUMENTS

DE 102012212254 B3 * 1/2014 .......... G02B 6/3886
DE 102017101891 A1 4/2018
(Continued)

OTHER PUBLICATIONS

Koh Chris, "The Benefits of 60GHz Unlicensed Wireless Communications", YDI Wireless Whitepaper, Introduction p. 1 (Year: 2004).*
(Continued)

*Primary Examiner* — Nam T Huynh
(74) *Attorney, Agent, or Firm* — Kaplan Breyer Schwarz, LLP (57) ABSTRACT

A coupling device for wireless data and energy transfer, includes a housing, a communication device located in the housing for wireless data transfer and designed to emit electromagnetic signals in a main emission direction, and a wireless energy transfer device located in the housing. The wireless energy transfer device includes a ferrite body with a through-opening and at least one air coil which defines an
(Continued)

opening and is located on the ferrite body. The air coil, the ferrite body and the communication device are arranged to each other in such a way that electromagnetic signals emitted by the communication device in the main emission direction propagate through the through-opening in the ferrite body and through the opening in the at least one air coil.

15 Claims, 8 Drawing Sheets

(51) Int. Cl.
    *H02J 50/10*      (2016.01)
    *H02J 50/12*      (2016.01)
    *H02J 50/80*      (2016.01)
    *H04B 5/26*      (2024.01)
    *H04B 5/43*      (2024.01)

(52) U.S. Cl.
    CPC ............. *H02J 50/80* (2016.02); *H04B 5/26* (2024.01); *H04B 5/43* (2024.01); *H04B 5/266* (2024.01)

(58) Field of Classification Search
    CPC .......... H04B 5/263; H01F 38/14; H02J 50/10; H02J 50/12; H02J 50/80; H02J 50/005; H02J 50/40; H02J 50/20; H02J 50/90; H02J 50/70; H02J 50/60; H02J 50/402
    See application file for complete search history.

(56) References Cited

U.S. PATENT DOCUMENTS

| | | |
|---|---|---|
| 2013/0321223 A1 | 12/2013 | Bokenfohr et al. |
| 2015/0349537 A1 | 12/2015 | Milne et al. |
| 2017/0237292 A1* | 8/2017 | Jeong .................... B60L 53/122 |
| | | 307/104 |
| 2018/0219334 A1 | 8/2018 | Kahlman |
| 2021/0265862 A1* | 8/2021 | Yeo ....................... H02J 50/005 |

FOREIGN PATENT DOCUMENTS

| | | |
|---|---|---|
| JP | 2014-514894 | 6/2014 |
| JP | 2017-041875 | 2/2017 |
| JP | 2018-133519 A | 8/2018 |
| JP | 2018-174628 A | 11/2018 |
| JP | 2018-534894 | 11/2018 |
| JP | 2019-533418 | 11/2019 |
| KR | 10-2018-0000707 | 1/2018 |
| WO | 2005112192 A1 | 11/2005 |

OTHER PUBLICATIONS

Office Action issued in JP Patent Application No. 2022-561470 on Nov. 29, 2023 and English Translation thereof.
Authorized Officer: Sieben, Stefan, International Search Report issued in PCT application No. PCT/EP2021/058705, May 26, 2021, 2 pp.
Search Report issued in Belgian patent application No. BE2020/5236, Nov. 17, 2020, 11 pp.
Wikipedia, Ferrite (magnet), https:en/wikipedia.org/wiki/Ferrite/(magnet), accessed Jan. 12, 2021, 16 pp. w/ translaation.
English Translation of the International Report on Patentability issued in PCT application No. PCT/EP2021/058705, Jun. 15, 2022, 7 pp.
Final Decision of Refusal issued in Japanese Patent Application No. 2022-561470, Aug. 1, 2024, 7 pp. w/ translation.
Office Action issued Aug. 1, 2023 in Korean Patent Application No. 10-2022-7039101 and English Translation thereof.

* cited by examiner

COUPLING DEVICE FOR WIRELESS DATA AND ENERGY TRANSFER, AND COUPLING SYSTEM FOR WIRELESS DATA AND ENERGY TRANSFER

FIELD

The invention relates to a coupling device for wireless data and energy, i.e. power, transfer and to a coupling system for data and power transfer.

BACKGROUND

Plug-in connector systems for data and power transfer are known. If plug-in connectors have to be disengaged and reconnected frequently, wear on the terminals is quite high, even if they are of very high quality. Such a scenario is known, for example, from industrial robotics, where a robot arm frequently has to grip and exchange changing tools, for example. In this case, the changing tool has to be mechanically and electrically connected to the robot arm. The mechanical connection is made using a coupling, while the electrical connection is often made using plug-in connectors equipped with wear-resistant gold terminals.

SUMMARY

The invention is therefore based on the object of providing a coupling device and a coupling system which in particular allow to replace an industrial plug-in connector and provide for both efficient wireless power transfer and fast wireless data transfer by virtue of a space-saving arrangement of the components within the coupling device.

What can be considered as a key idea of the invention is to provide a coupling device for wireless data and power transfer, which is adapted to
i) inductively transfer supply energy, by using an air coil, also known as air core coil, which acts as a primary coil, and a ferrite body having a through-opening, to a secondary coil of a coupling device that is acting as a secondary coupler, and to
ii) transmit, by using a communication device, data in the form of electromagnetic signals in a main emission direction through the through-opening of the ferrite body and through the air coil to a complementary communication device of the secondary coupler. By virtue of this measure, a compact design is created, which provides for efficient wireless power and data transfer between two coupling devices. Fast data transfer can in particular be achieved by the fact that the communication device is able to emit radio-frequency electromagnetic signals in the sense of a directional radio transmission.

The technical problem stated above is solved by the features of claim 1, by the features of claim 3, and by the features of claim 14.

Advantageous embodiments and refinements are specified by the subject-matter of the dependent claims.

BRIEF DESCRIPTION OF THE DRAWINGS

The invention will now be explained in more detail by way of a few exemplary embodiments in conjunction with the accompanying drawings, wherein.

DETAILED DESCRIPTION

Figure 1:
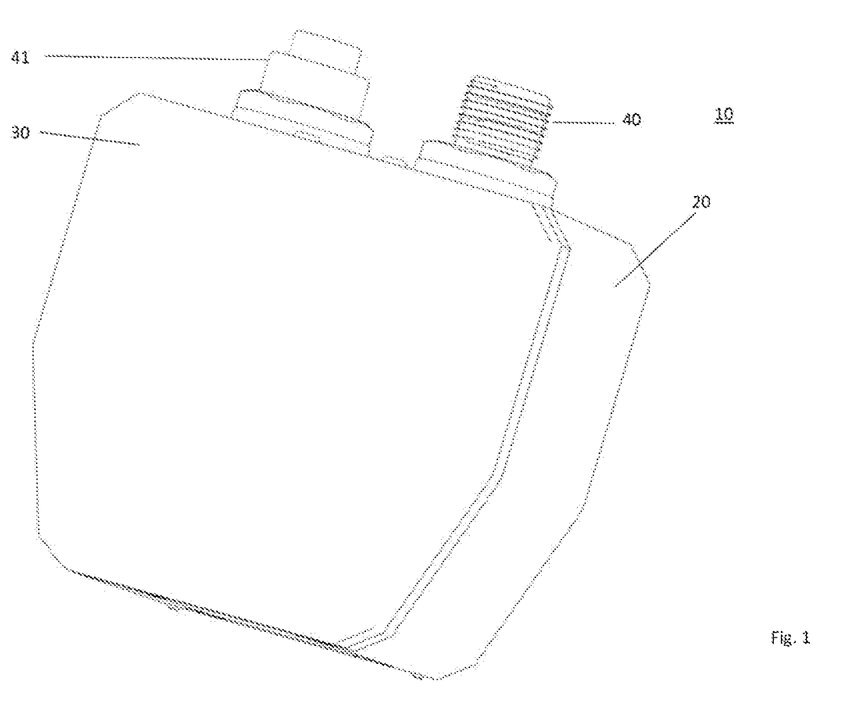
FIG. 1 shows an exemplary coupling device with the housing closed.

FIG. 1 shows an exemplary coupling device 10 for wireless data and power transfer, which may advantageously comprise a two-part housing comprising of a base part 20 and a cover 30 that is adapted to close the base part 20. Furthermore, the coupling device 10 has a power supply connection 40 to which an external power supply source can be connected. In addition, the coupling device 10 has a communication interface 41 via which data can be transmitted to an external data sink or can be received from an external data source. Coupling device 10 is particularly suitable for use in an industrial environment, such as in robot-assisted automation systems.

Figure 2:
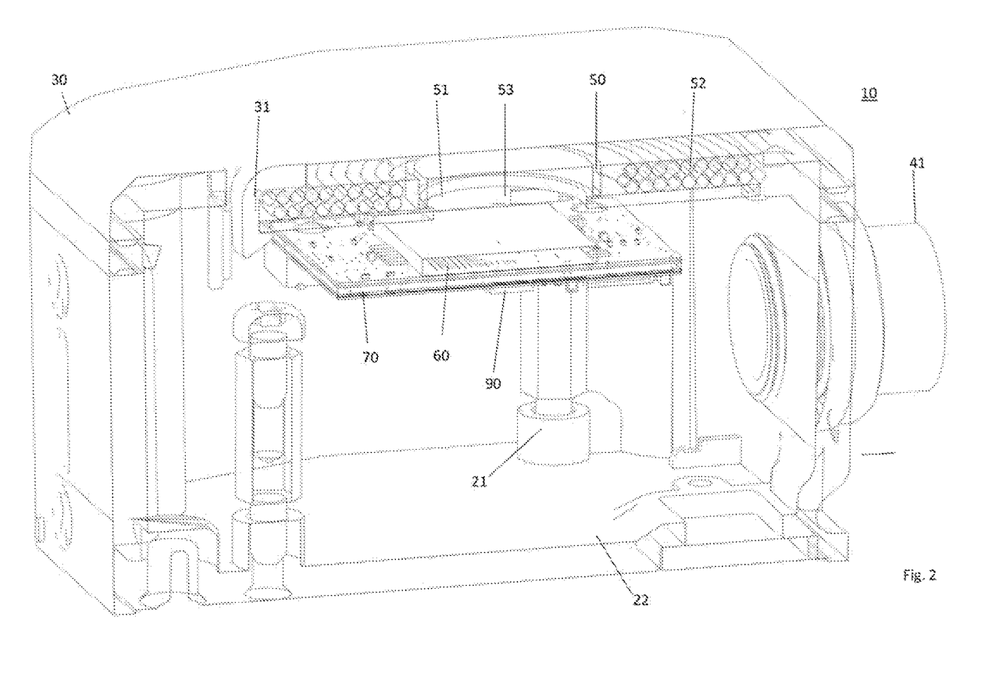
FIG. 2 shows the coupling device of FIG. 1 with the housing partially removed.

FIG. 2 shows the coupling device 10 illustrated in FIG. 1, with the housing 20, 30 partially removed. A communication device 60 for wireless data transfer is accommodated in the housing 20, 30. The communication device 60 is in particular adapted to emit electromagnetic signals in a main emission direction. This means that the communication device 60 is designed in such a way that the majority of energy emitted therefrom will propagate along the main emission direction. As can be seen in particular in FIG. 5a, the main emission direction extends parallel to an axis, here parallel to the y-axis of the coordinate system shown in FIG. 5a. Furthermore, a wireless power transfer device 50 is accommodated in the housing 20, 30, which comprises a ferrite body 51 with a through-opening 53 and at least one air coil 52 defining an opening 54, which is arranged on the ferrite body 51. For example, FIG. 2 illustrates two air coils arranged one above the other. Power transfer device 50 is again illustrated separately in FIG. 4.

Figure 4:
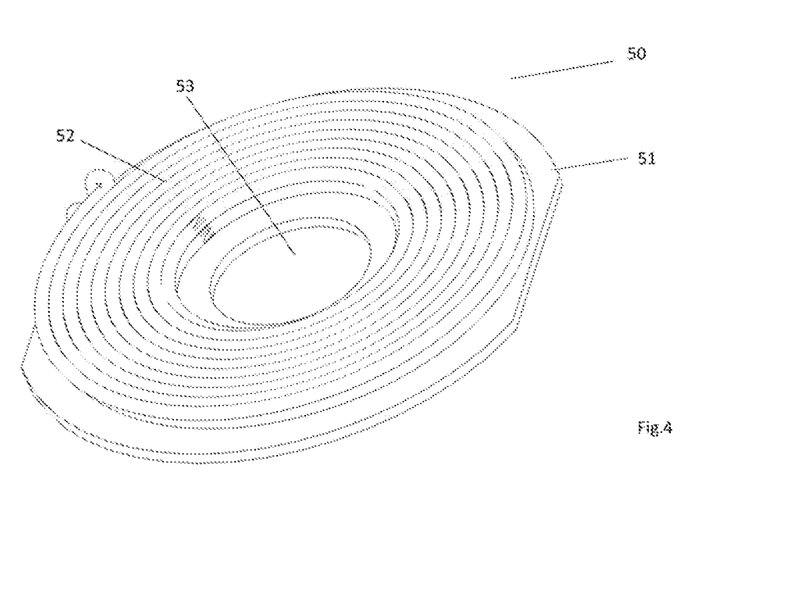
FIG. 4 shows the air coil of FIGS. 2 and 3 arranged on the ferrite body.

As can be seen in FIG. 4, the ferrite body may have a substantially disk-shaped configuration, for example, with through-opening 53 provided centrally therein. Through-opening 53 may have an inner diameter of 14 mm, for example, while the disk-shaped ferrite body 51 may have a diameter of 45 mm, for example. The air coil 52 is arranged so that, at a surface of the ferrite body 5 which preferably extends parallel to the cover 30, the opening 54 defined by the air coil 52 is aligned with the through-opening 53. It should be noted that the surface of the ferrite body 51 facing the cover 30 may have a groove provided therein, into which the at least one air coil 52 can be inserted. In this way it is possible to fix the position of the air coil 52 relative to the ferrite body 51.

As can furthermore be seen in FIG. 2, the power transfer device 50 can be detachably supported on the cover, for example by latching lugs 31 which can be formed integrally with the cover 30. In the exemplary views of FIGS. 2 and 5a, the at least one air coil 52 is arranged between the ferrite body 51 and the cover 30.

Figure 5A:
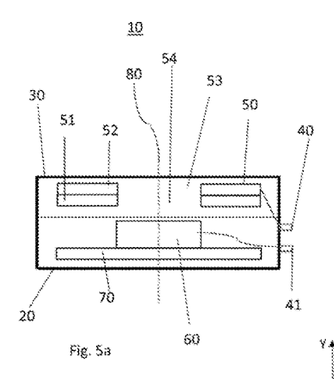
FIG. 5a is a schematic view of the coupling device illustrated in FIG. 2, with the communication device arranged spaced apart from the ferrite body.

As can be seen in particular in FIG. 5a, the communication device 60, the ferrite body 51, and the air coil 52 are arranged one behind the other and in different planes with respect to the main emission direction which extends in the y-direction, each of these planes being parallel to a plane spanned by the x- and z-axes. In other words: referring to the coupling device 10 as shown in FIG. 5a, the communication device 60 is arranged below and spaced apart from the power transfer device 50.

As shown in FIG. 2 and in FIG. 5a, the air coil 52, the ferrite body 51 and the communication device 60 are arranged relative to one another in such a way that electromagnetic signals emitted by the communication device 60 propagate in the main emission direction 80 through the through-opening 53 of the ferrite body 51 and through the opening 54 of the at least one air coil 52. The through-opening 53 and the opening 54 of air coil 52 thus form a type of funnel for the electromagnetic signals emitted by the communication device 60, through which data from a data source can be transmitted.

The communication interface 41 of coupling device 10 can also be seen in FIG. 2.

Cover 30 preferably has an area that is transmissive for electromagnetic waves, and the main emission direction 80 extends orthogonally to the area that is transmissive for electromagnetic waves, as can be seen in particular in FIG. 5a. The area of the cover 30 transmissive for electromagnetic waves is in particular aligned with the through-opening 53 of ferrite body 51 and with the opening 54 of air coil 52. Preferably, the entire cover 30 is made of a plastics material that is transmissive for electromagnetic waves.

As shown in FIG. 2, the base part 20 of the housing may have a base wall 22, and a circuit board 70 with the communication device 60 mounted thereon can be arranged parallel thereto. As can be seen in particular in FIG. 5a, in the assembled state, the printed circuit board 70, the at least one air coil 52, and the ferrite body 51 are each arranged in different planes which lie parallel to each other and parallel to a plane spanned by the x- and z-axes. As can be seen in particular in FIG. 5a, the main emission direction 80 is perpendicular to these planes.

According to an advantageous embodiment, the communication device 60 has an antenna device which is adapted for emitting radio signals in the main emission direction 80, which emitted radio signals are in a first frequency band. It is preferred to use a frequency band which provides sufficiently high bandwidth, for example in order to be able to simultaneously transmit and receive radio signals over different frequencies. In this respect, it proved to be advantageous to use a frequency band which has relatively poor propagation properties. For example, an ISM band in the gigahertz range is used for this purpose. Preferably, the first frequency band is within a frequency range from 57 to 66 GHz. It is also conceivable to use an ISM band in a higher frequency range.

The communication device 60 comprising an antenna device is also adapted to receive radio signals in a second frequency band. The received radio signals have a main reception direction which coincides with the main emission direction 80 if a single antenna is used for transmitting and receiving, and which extends parallel to the main emission direction 80 through the through-opening 53 in the ferrite body 51 and through the opening 54 in the at least one air coil 52 if a transmitting antenna and a receiving antenna are used for transmitting and receiving, which are spatially separated from one another. The first frequency band and the second frequency band are preferably different, but they may also be the same. Preferably, the second frequency band is also an ISM band in the gigahertz range, which is preferably within a frequency range from 57 to 66 GHz.

Figure 7:
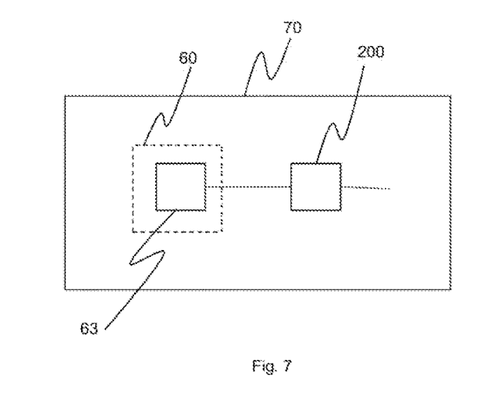
FIG. 7 shows the communication device illustrated in FIG. 2 and in FIG. 5a, comprising a single antenna device that is operative as a transmitting and receiving antenna.

According to an advantageous embodiment, the antenna device of communication device 60 may comprise a combined antenna 63 for transmitting and receiving radio signals. For example, FIG. 7 shows an exemplary printed circuit board 70 with communication device 60, which comprises the combined antenna 63 as the antenna device. The printed circuit board 70 equipped like this by way of example is installed in the coupling device 10 which is shown in FIG. 2 and FIG. 5a, by way of example. Radio-frequency electronics 200 can be used in a manner known per se for controlling the single antenna 63, for example by comprising a duplexer which alternately allows radio signals to be emitted by the antenna 63 in the first frequency band or radio signals to be received by the antenna 63 in the second frequency band. In this case, the first frequency band and the second frequency band for the radio signals to be transmitted and for the radio signals received can be the same. It is also possible to employ a diplexer, which is known per se, instead of a duplexer.

Figure 6:
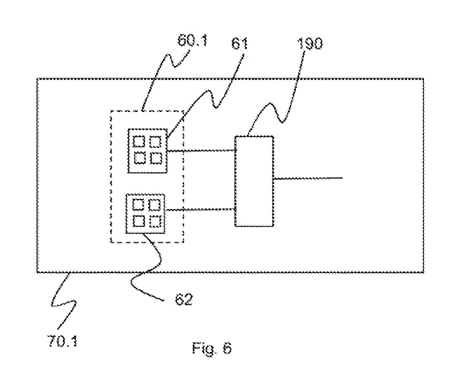
FIG. 6 shows a communication device mounted on a printed circuit board, comprising a transmitting antenna and a receiving antenna spatially separated from each other.

Instead of the single transmitting and receiving antenna 63, it is also possible to use a communication device 60.1 which comprises a transmitting antenna 61 and a receiving antenna 62 spatially separated therefrom, as illustrated in FIG. 6. The communication device 60.1 may again be mounted on a printed circuit board 70.1. The two antennas 61 and 62 can be controlled by radio-frequency electronics 190 in a manner known per se. The transmitting and receiving antenna 63 as shown in FIG. 7 as well as the transmitting antenna 61 and the receiving antenna 62 as shown in FIG. 6 can be connected to the communication interface 41 that can be seen in FIG. 5a, in particular via the radio-frequency electronics 200 or 190, respectively. It should be noted that the communication interface 41 can be in the form of an optical or an electrical communication interface. Advantageously, the communication interface 41 may be an Ethernet-based communication interface which supports an Ethernet protocol. It should be noted here, that the radio-frequency electronics 200 can also be a component of communication device 60, and that the radio-frequency electronics 190 can also be a component of communication device 60.1. It will be apparent that the radio-frequency electronics 190 can be arranged either on the same face of the printed circuit board as the antennas 61 and 62 or else on the back of the printed circuit board 70. It is also conceivable to provide further printed circuit boards in the housing 20, 30, with electronics and/or electrical circuits required for the operation of coupling device 10 mounted thereon. Radio-frequency electronics 190 and 200 may each comprise a modulator for modulating the electromagnetic waves with data to be transmitted and a demodulator for demodulating received electromagnetic signals, as is known per se.

Figure 3:
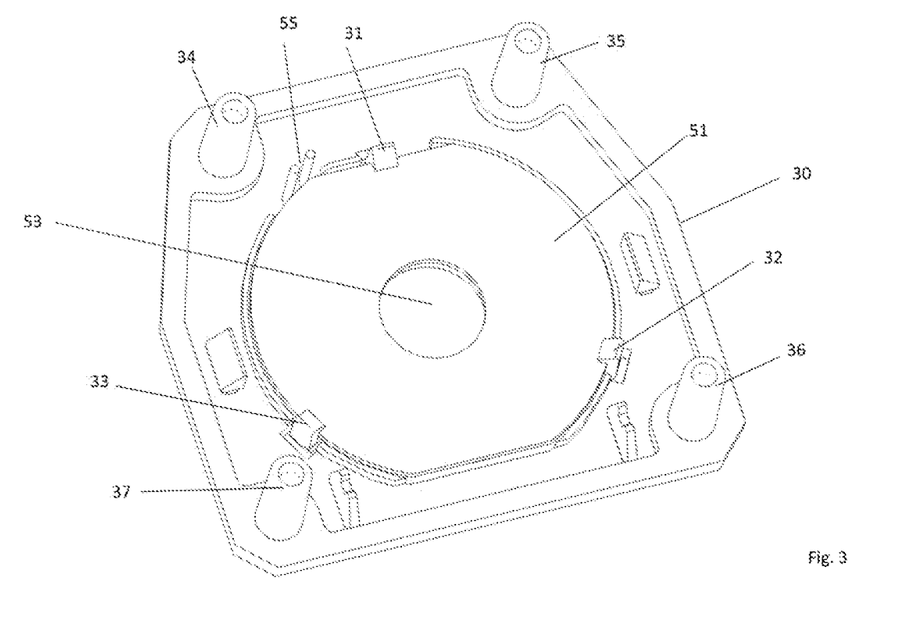
FIG. 3 shows a bottom view of the cover shown in FIG. 1, with the ferrite body and the air coil mounted on the cover.

It should be noted at this point that the connections 55 of the air coil 52, which can be seen in particular in FIG. 3, can be connected to the power supply connection 40 as schematically illustrated in FIG. 5a, either directly or via respective voltage converters (not shown).

In order to provide for an efficient and space-saving design, the two antennas 61 and 62 may each be in the form of a patch antenna and can be arranged on printed circuit board 70.1. Similarly, the transmitting and receiving antenna 63 according to FIG. 7 can be in the form of a patch antenna and can be arranged on printed circuit board 70.

Figure 8:
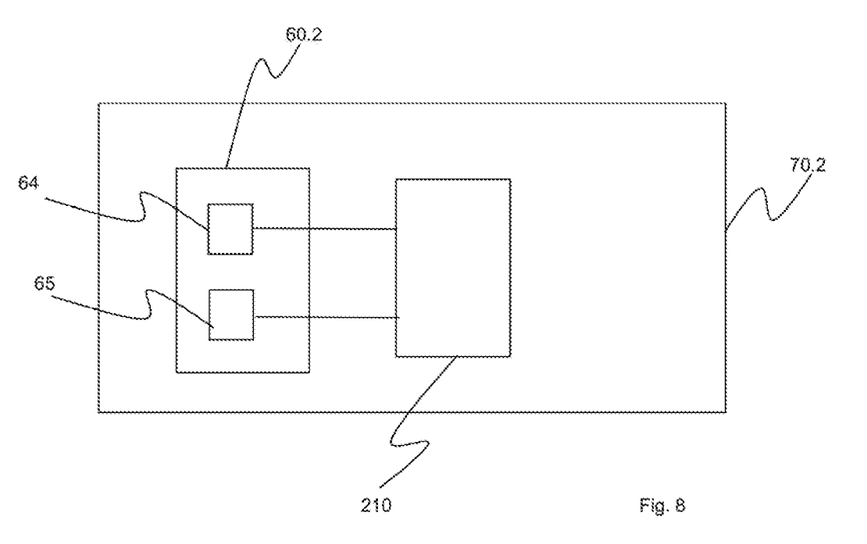
FIG. 8 shows an alternative communication device mounted on a printed circuit board, comprising an optical transmitter and an optical receiver.

Instead of the transmitting and receiving antenna 63 according to FIG. 7 or the transmitting antenna 61 and the receiving antenna 62 according to FIG. 6, a communication device 60.2 can be provided, which may comprise an optical transmitter 64 and optionally an optical receiver 65 arranged spatially separated therefrom, as schematically illustrated in FIG. 8. The optical transmitter 64 and the optical receiver 65 can again be mounted on a printed circuit board 70.2, in which case the printed circuit board 70.2 can again be installed in the coupling device 10 shown in FIG. 2, instead of printed circuit board 70 or printed circuit board 70.1. An LED or a laser diode can be used as the optical transmitter 64, as is known per se, while the optical receiver 65 can be implemented in the form of a phototransistor, for example. Appropriate control electronics 210 can again be provided on the printed circuit board 70.2, adapted for controlling the optical transmitter 64 and the optical receiver 65 for transmitting and receiving optical signals. Optical reception signals and optical transmission signals may differ in their wavelength, for example. The optical transmitter 64 is adapted to emit optical signals in a main emission direction through the through-opening 53 of ferrite body 51 and through the opening 54 defined by air coil 52, which main emission direction extends parallel to the y-axis shown in FIG. 5a. The optical signals received by the optical receiver 65 from a complementary coupling device have a main beam direction through the through-opening 53 of ferrite body 51 and through the opening 54 of air coil 52 substantially parallel to the main emission direction of the optical transmitter 64.

Figure 5B:
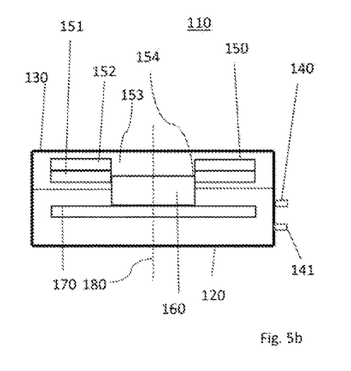
FIGS. 5b and 5c are schematic views of an alternative coupling device, with the communication device at least partially located in the through-opening of the ferrite body.

FIG. 5b shows an alternative coupling device 110 for wireless data and power transfer. Essentially, coupling device 110 differs from coupling device 10 in that a communication device 160, which is adapted to emit electromagnetic signals in a main emission direction 180, is at least partially arranged within a through-opening 153 of a ferrite body 151. The communication device 160 can be arranged on a printed circuit board 160 similar to communication device 60. The explanations regarding coupling device 10 thus essentially also describe the coupling device 110. At least one air coil 152 defining an opening 154 may be arranged on the ferrite body 151. The air coil 152 and the ferrite body 151 form a power transfer device 150 which may substantially be configured like power transfer device 50. In this respect, reference is made to the explanations of power supply device 50 and to FIGS. 3 and 4. Similar to coupling device 10, the coupling device 110 preferably has a power supply connection 140 and a communication interface 141.

Figure 5C:
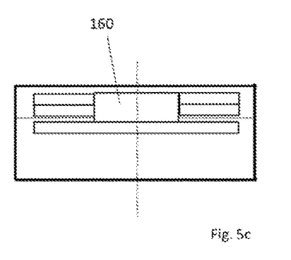

FIG. 5c shows the coupling device 110 illustrated in FIG. 5b, with the communication device 160 now completely accommodated in the through-opening 153 of ferrite body 151 and in the opening 154 of air coil 152.

According to an exemplary embodiment as illustrated in FIG. 3, the ferrite body 53 is disk-shaped, and the air coil 52 may also have the same cross section. In this case, the main emission direction of communication device 60, 60.1, or 60.2 extends substantially parallel to the rotational axis of ferrite body 51 and of air coil 52. The ferrite body 51 and thus the air coil 52 can be detachably mounted on the cover 30 using latching lugs 31 to 33. The ferrite body 151 and thus the air coil 152 can also be detachably mounted on the cover 30 in a similar way.

Figure 9:
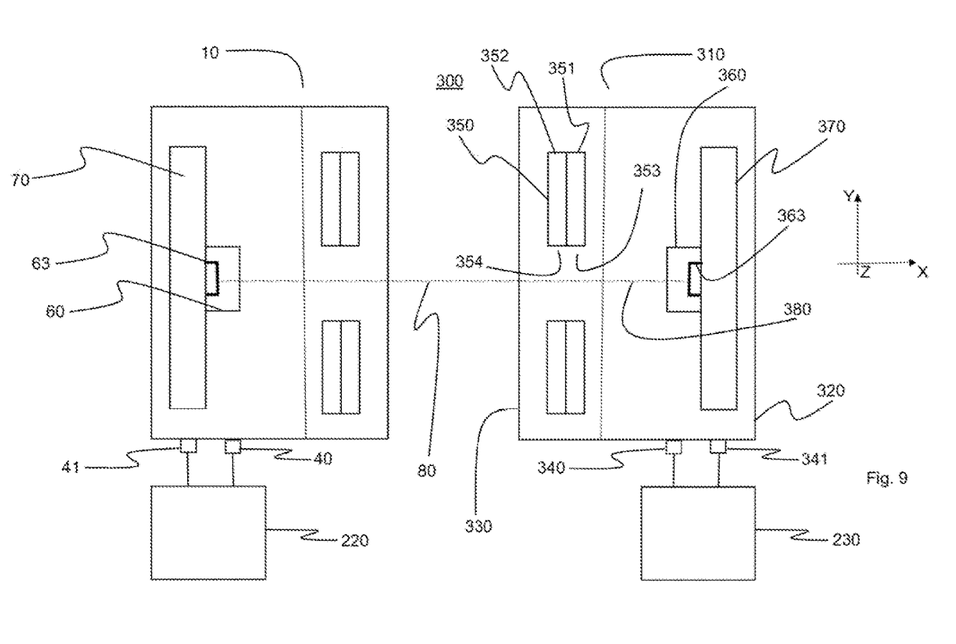
FIG. 9 shows an exemplary coupling system illustrating the coupling device shown in FIGS. 2 and 5a in a coupled state with a complementary coupling device, each one connected to an electrical and/or electronic device.

In order to be able to wirelessly transfer data and energy between a first electrical and/or electronic device 220 and a second electrical and/or electronic device 230, for example, an exemplary coupling system 300 is provided, which is exemplified in FIG. 9. The coupling system 300 comprises a first coupling device, which in the present example is the coupling device 10 as shown in FIGS. 2, 5a, and 7, and a second, complementary coupling device 310.

As illustrated in FIG. 9, coupling device 10 is connected to the electronic and/or electrical device 220 via power supply connection 40 and via communication interface 41. Assuming, for the present example, that the electrical and/or electronic device 220 comprises a data source that generates data for wireless transmission to the electrical and/or electronic device 230 and is capable of supplying those data to communication interface 41 via an electrical or optical transfer medium. Furthermore, by way of example, the electrical and/or electronic device 220 comprises a power supply device that transfers energy, i.e. electrical power, to power supply connection 40, for example via an electrical cable, which can then be transferred via power transfer device 50 and the complementary coupling device 310 to the electrical and/or electronic device 230 in a wireless manner. It should be noted at this point, that both the coupling device 10 and the complementary coupling device 310 are adapted to process the power supplied by the electrical and/or electronic device 220 in such a way that the components of coupling device 10 and the components of coupling device 310 can be powered adequately.

The term "complementary" in particular means that at least a communication device 360 of the coupling device 310 is configured so as to be complementary to the communication device 60 of coupling device 10. In the exemplary embodiment shown in FIG. 9 this means that the communication device 60 includes the single transmitting and receiving antenna 63 as shown in FIG. 6, and the communication device 360 also includes a single transmitting and receiving antenna 363, which are arranged so as to be aligned with one another in the coupled state. In this example, the main emission direction and the main receiving beam direction, which are parallel to the x-axis with respect to communication device 60, coincide.

However, if the coupling device 10 has the communication device 60.1 as shown in FIG. 7 implemented therein, which comprises the transmitting antenna 61 and the receiving antenna 62, then the communication device 360 will also include a transmitting antenna and a receiving antenna spatially separated therefrom. In the coupled state, the transmitting antenna 61 is arranged in alignment with the receiving antenna of communication device 360, and the receiving antenna 62 is arranged in alignment with the transmitting antenna of communication device 360. In this way, bidirectional data transfer is made possible between the device 220 and the device 230. It should moreover be noted that the main emission direction of transmitting antenna 61 and, if provided, that of the transmitting antenna of communication device 360 are parallel to one another and parallel to the x-axis of the coordinate system indicated in FIG. 9. A similar complementary design of the coupling device 360 results when the communication device 60.2 comprising the optical transmitter 64 and the optical receiver 65 is implemented in coupling device 10.

The transmitting and receiving antenna 363 of communication device 360 may be arranged on a printed circuit board 370. Otherwise, the coupling device 310 is preferably configured similarly to coupling device 10. In other words: coupling device 310 has a housing 320, 330 which may comprise a cover 330 and a base part 320. The housing 320, 330 accommodates the communication device 360 for wireless data transfer, and the communication device 360 is adapted for receiving electromagnetic signals in a main receiving direction. In the coupled state, the main emission direction of the transmitting and receiving antenna 63 of coupling device 10 and the main receiving direction of the transmitting and receiving antenna 363 of coupling device 310 lie on a common line 380 which is parallel to the x-axis of the coordinate system indicated in FIG. 9. Similar to coupling device 10, the power transfer device 350 comprising an air coil 352 and a ferrite body 351 is detachably mounted in the housing of coupling device 310, preferably on the cover 330 of the housing. Power transfer device 350 can be configured similarly to the power transfer device 50 of coupling device 10 shown in FIG. 4. Therefore, a more detailed explanation is not necessary. Air coil 352, ferrite body 351, and communication device 360 are arranged relative to one another in such a way that the electromagnetic radio signals emitted by the transmitting and receiving antenna 63 of coupling device 10 propagate to the communication device 360 and to the transmitting and receiving antenna 363 through the opening 354 of air coil 352 and through the through-opening 353 of ferrite body 351 in the main receiving direction which is along line 380. As can be seen in FIG. 9, in the coupled state, the through-opening 53 of ferrite body 51, the opening 54 of air coil 52 of the first coupling device 10 are aligned with each other and with the through-opening 353 of the ferrite body 351 and with the opening 354 of the air coil 352 of the second coupling device 310, so that the electromagnetic signals emitted by the transmitting and receiving antenna 63 of communication device 60 can be received by the transmitting and receiving antenna 363 of communication device 360. For example, the main emission direction and main reception direction extend through the center of through-openings 53 and 353 and of openings 54 and 354. In the exemplary embodiment illustrated in FIG. 9, the air coil 52 of the first coupling device 10 acts as the primary coil and the at least one air coil 352 of the second coupling device 310 acts as the secondary coil for wireless power transfer. As shown in FIG. 9, a spacing between coupling device 10 and coupling device 310 is small in the coupled state, it may range between 0 and 10 cm, for example. Obviously, it is also conceivable that the two coupling devices 10 and 310 contact each other in the coupled state. In the embodiment illustrated in FIG. 9, the covers 330 and 30 are each effective as coupling surfaces of the coupling system 300.

In order to enable bidirectional data communication, data can be transferred from the device 230 via the transmitting and receiving antenna 363 of coupling device 310 to the transmitting and receiving antenna 63 of coupling device 10 and from there to the device 220.

At least some of the aforementioned exemplary aspects shall again be summarized below.

A coupling device 10 for wireless data and power transfer is provided, which is shown in FIG. 2 and FIG. 5a by way of example, in conjunction with FIGS. 3 and 4. By way of example, it comprises the following features:

a housing 20, 30, a communication device 60 for wireless data transfer accommodated in the housing 20, 30, the communication device 60 being adapted for emitting electromagnetic signals in a main emission direction which extends parallel to the y-axis as shown in FIG. 5a, for example, and a wireless power transfer device 50 accommodated in the housing 20, 30, which comprises a ferrite body 51 with a through-opening 53 and at least one air coil 52 defining an opening 54 and arranged on the ferrite body 51, and the air coil 52, the ferrite body 51, and the communication device 60 are arranged to each other in such a way that electromagnetic signals emitted by the communication device 60 in the main emission direction propagate through the through-opening 53 of the ferrite body 51 and through the opening 54 of the at least one air coil 52.

The power transfer device 50 and the communication device 60 may be arranged one behind the other with respect to the main emission direction, for example.

The communication device 60 may advantageously comprise an antenna device 61, 62, or 63, which can be configured for emitting radio signals in a first frequency band and for simultaneously receiving radio signals in a second frequency band, and each of the first and second frequency bands can be an ISM band in the GHz range and can advantageously lie within a frequency range from 57 to 66 GHz or in a higher frequency range.

An alternative coupling device 110 for wireless data and power transfer is shown in FIGS. 5b and 5c. By way of example, it comprises the following features:

a housing 120, 130, a communication device 160 for wireless data transfer accommodated in the housing 120, 130, the communication device 160 being adapted for emitting electromagnetic signals in a main emission direction, a wireless power transfer device 150 accommodated in the housing 120, 130, which comprises a ferrite body 151 with a through-opening 153 and at least one air coil 152 defining an opening 154 and being arranged on the ferrite body 151, the through-opening 153 of the ferrite body 151 and the opening 154 of the air coil 152 being aligned with one another, and with the communication device 160 being at least partially accommodated within the through-opening 153 of the ferrite body 151.

Advantageously, the communication device 160 may comprise an antenna device which can be similar to the antenna device 61, 62, or 63. The antenna device can be configured for emitting radio signals in a first frequency band and for simultaneously receiving radio signals in a second frequency band, and each of the first and second frequency bands can be an ISM band in the GHz range and can advantageously lie within a frequency range from 57 to 66 GHz or in a higher frequency range.

Advantageously, the air coil 152, the ferrite body 151, and the communication device 160 are arranged to each other in such a way that electromagnetic signals emitted by communication device 160 in the main emission direction can propagate through the through-opening 153 of ferrite body 151 and through the opening 154 of the at least one air coil 152.

Coupling device 10 and 110 preferably has a power supply connection 40; 140 electrically connected to the at least one air coil 52; 152, to which an external power supply device can be connected, and a communication interface 41; 141 electrically or optically connected to the communication device 60; 160, to which an external message source 220 can be connected.

The housing 20, 30; 120, 130 can preferably comprise a cover 30; 130 and a base part 20; 120 that can be covered by the cover 30; 130, and the power transfer device 50; 150 can be adapted to be mounted on the cover 30; 130.

The cover 30, 130 can preferably have a portion that is transmissive to electromagnetic waves, and the main emission direction extends orthogonally to the portion that is transmissive to electromagnetic waves.

Preferably, the cover 30, 130 is made of a plastics material.

The base part 20 may have a base wall 22, and a printed circuit board 70, 70.1, 70.2 can be arranged parallel thereto, on which the communication device 60, 60.1, 60.2 can be mounted, and, in the assembled state, the printed circuit board 70, 70.1, 70.2, the at least one air coil 52, and the ferrite body 51 each lie in a respective plane, which planes are parallel to one another, and with the main emission direction extending perpendicular to these planes.

The communication device 60, 60.1 preferably has an antenna device which is configured for emitting radio signals in the main transmission direction, and the emitted radio signals are in a first frequency band.

The first frequency band can be an ISM band in the GHz range, which preferably is within a frequency range from 57 to 66 GHz.

The antenna device can be configured for receiving radio signals in a second frequency band, and the received radio signals have a main reception direction that extends parallel to the main emission direction through the through-opening 53 of the ferrite body 51 and through the opening 54 of the at least one air coil 52, wherein, depending on the implementation, the first frequency band and the second frequency band can be different or the same.

The second frequency band can be an ISM band in the GHz range and is preferably within a frequency range from 57 to 66 GHz.

According to an advantageous embodiment, the antenna device 60 and also the antenna device of the coupling device 110 may each comprise a combined antenna 63 for transmitting and receiving radio signals, and in this case the received radio signals have a main reception direction which can preferably coincide with the main emission direction. Alternatively, the antenna device 60 and also the antenna device of the coupling device 110 may comprise a transmitting antenna 61 and a separate receiving antenna 62, and in this case the received radio signals have a main reception direction which preferably extends at least in part parallel to the main emission direction through the through-opening 53 of ferrite body 51 and through the opening 54 of the at least one air coil 52.

Both the combined antenna 63 for transmitting and receiving as well as the transmitting antenna 61 and the separate receiving antenna 62 may each be in the form of a patch antenna.

Alternatively, the communication device 60.2 may comprise an optical transmitter 64 for emitting optical signals in the main emission direction and optionally an optical receiver 65 for receiving optical signals, and the received optical signals have a main beam direction that extends parallel to the main emission direction through the through-opening 53 of the ferrite body 51 and through the opening 54 of the at least one air coil 52.

Preferably, the communication device 60, 60.1, 60.2 has a control device 200, 190, 210 associated therewith.

According to a further advantageous aspect, a coupling system 300 for wireless data and power transfer is provided as shown in FIG. 9 by way of example, which can comprise the following exemplary features:

a first coupling device 10, 110 as described above, which first coupling device 10 can be connected to a first electronic and/or electrical device 220, and a second, complementary coupling device 310 which can be connected to a second electrical and/or electronic device 230 and may have the following features:

a housing 320, 330, a communication device 360 for wireless data transfer accommodated in the housing 320, 330, which communication device 360 can be adapted complementary to the communication device 60 to receive electromagnetic signals in a main receiving direction, and a wireless power transfer device accommodated in the housing 320, 330, which comprises a ferrite body 351 with a through-opening 353 and at least one air coil 352 defining an opening 354 and being arranged on the ferrite body 351, wherein the air coil 352, the ferrite body 351 and the communication device 360 are arranged to each other in such a way that received electromagnetic signals propagate to the communication device 360 in the main receiving direction through the through-opening 353 of the ferrite body 351 and through the opening 354 of the at least one air coil 352, wherein, in the coupled state, the through-opening 53 of the ferrite body 51 of the first coupling device 10, 110 is aligned with the through-opening 353 of the ferrite body 351 of the second coupling device, so that the electromagnetic signals emitted by the communication device 60 of the first coupling device 10 are received by the communication device 360 of the second coupling device 310, and wherein the at least one air coil 52 of the first coupling device 10 functions as a primary coil and the at least one air coil 352 of the second coupling device 310 functions as a secondary coil.

The invention claimed is:

1. A coupling device for wireless data and power transfer, comprising:
   a housing;
   a communication device for wireless data transfer accommodated in the housing, the communication device adapted for emitting electromagnetic signals in a main emission direction; and
   a wireless power transfer device accommodated in the housing, wherein the wireless power transfer device comprises a ferrite body with a through-opening and at least one air coil defining an opening, wherein the at least one air coil is arranged on the ferrite body, wherein the air coil, the ferrite body, and the communication device are arranged to each other in such a way that electromagnetic signals emitted by the communication device in the main emission direction propagate through the through-opening of the ferrite body and through the opening of the at least one air coil;
   wherein the communication device has an antenna device which is configured for emitting radio signals in the main emission direction, wherein the emitted radio signals are in a first frequency band; and
   wherein the first frequency band is an ISM band in the GHz range and is within a frequency range from 57 to 66 GHz or in a higher frequency range.

2. The coupling device of claim 1, wherein the power transfer device and the communication device are arranged one behind the other with respect to the main emission direction.

3. A coupling device for wireless data and power transfer, comprising:
   a housing;

a communication device for wireless data transfer accommodated in the housing, the communication device adapted for emitting electromagnetic signals in a main emission direction; and a wireless power transfer device accommodated in the housing, wherein the wireless power transfer device comprises a ferrite body with a through-opening and at least one air coil defining an opening, wherein the at least one air coil is arranged on the ferrite body;

wherein the through-opening of the ferrite body and the opening of the air coil are aligned with one another, and wherein the communication device is at least partially accommodated inside the through-opening of the ferrite body;

wherein the communication device has an antenna device which is configured for emitting radio signals in the main emission direction, wherein the emitted radio signals are in a first frequency band; and wherein the first frequency band is an ISM band in the GHz range and is within a frequency range from 57 to 66 GHz or in a higher frequency range.

4. The coupling device as claimed in claim 3, further comprising:

a power supply connection which is electrically connected to the at least one air coil and to which an external power supply device can be connected; and a communication interface which is electrically or optically connected to the communication device and to which an external message source can be connected.

5. The coupling device as claimed in claim 3, wherein the housing has a cover and a base part which can be covered by the cover, and wherein the power transfer device can be mounted on the cover.

6. The coupling device of claim 5, wherein the cover has a portion that is transmissive to electromagnetic waves, and wherein the main emission direction extends orthogonally to the portion that is transmissive to electromagnetic waves.

7. The coupling device of claim 5, wherein the cover is made of a plastics material.

8. The coupling device as claimed in claim 5, wherein the base part has a base wall and, arranged parallel thereto, a printed circuit board on which the communication device can be mounted, and wherein, in the assembled state, the printed circuit board, the at least one air coil, and the ferrite body each lie in a respective plane, which planes are parallel to one another, wherein the main emission direction extends perpendicular to these planes.

9. The coupling device as claimed in claim 3, wherein the antenna device is configured for receiving radio signals in a second frequency band, wherein the received radio signals have a main reception direction which extends parallel to the main emission direction through the through-opening of the ferrite body and through the opening of the at least one air coil, and wherein the first frequency band and the second frequency band are different or the same.

10. The coupling device of claim 9, wherein the second frequency band is an ISM band in the GHz range.

11. The coupling device as claimed in claim 3, wherein the antenna device is configured for receiving radio signals in a second frequency band, wherein the received radio signals have a main reception direction which extends parallel to the main emission direction through the through-opening of the ferrite body and through the opening of the at least one air coil, wherein the first frequency band and the second frequency band are different or the same, and wherein the antenna device comprises a combined antenna for transmitting and receiving radio signals; or comprises a transmitting antenna and a separate receiving antenna.

12. The coupling device of claim 11, wherein the combined antenna for transmitting and receiving or the transmitting antenna and the separate receiving antenna are each in the form of a patch antenna.

13. The coupling device as claimed in claim 3, wherein the communication device comprises a control device.

14. A coupling system for wireless data and power transfer, comprising:

a first coupling device as claimed in claim 1, wherein the first coupling device can be connected to a first electronic and/or electrical device;

a second, complementary coupling device which can be connected to a second electrical and/or electronic device and which has the following features:

a housing;

a communication device for wireless data transfer accommodated in the housing, wherein the communication device is adapted to receive electromagnetic signals in a main receiving direction; and a wireless power transfer device accommodated in the housing, wherein the wireless power transfer device comprises a ferrite body with a through-opening and at least one air coil defining an opening, wherein the at least one air coil is arranged on the ferrite body, wherein the air coil, the ferrite body and the communication device are arranged to each other such that received electromagnetic signals propagate to the communication device in the main receiving direction through the through-opening of the ferrite body and through the opening of the at least one air coil;

wherein, in the coupled state, the through-opening of the ferrite body of the first coupling device is aligned with the through-opening of the ferrite body of the second coupling device, so that the electromagnetic signals emitted by the communication device of the first coupling device are received by the communication device of the second coupling device; and wherein the at least one air coil of the first coupling device functions as a primary coil and the at least one air coil of the second coupling device functions as a secondary coil.

15. The coupling device of claim 10, wherein the second frequency band is within a frequency range from 57 to 66 GHz or in a higher frequency range.

* * * * *